(12) United States Patent
Bernal et al.

(10) Patent No.: US 9,641,763 B2
(45) Date of Patent: May 2, 2017

(54) SYSTEM AND METHOD FOR OBJECT TRACKING AND TIMING ACROSS MULTIPLE CAMERA VIEWS

(71) Applicant: Xerox Corporation, Norwalk, CT (US)

(72) Inventors: Edgar A. Bernal, Webster, NY (US);
Robert P. Loce, Webster, NY (US);
Thomas F. Wade, Rochester, NY (US);
Peter Paul, Webster, NY (US)

(73) Assignee: Conduent Business Services, LLC, Dallas, TX (US)

( * ) Notice: Subject to any disclaimer, the term of this patent is extended or adjusted under 35 U.S.C. 154(b) by 598 days.

(21) Appl. No.: 13/973,330

(22) Filed: Aug. 22, 2013

(65) Prior Publication Data

US 2014/0063263 A1 Mar. 6, 2014

Related U.S. Application Data

(60) Provisional application No. 61/694,596, filed on Aug. 29, 2012.

(51) Int. Cl.
| | | |
|---|---|---|
| *H04N 5/225* | (2006.01) | |
| *H04N 7/18* | (2006.01) | |
| *B60Q 1/48* | (2006.01) | |
| *B60R 21/0136* | (2006.01) | |
| *H04N 5/232* | (2006.01) | |
| *G08B 13/196* | (2006.01) | |

(52) U.S. Cl.
CPC ... *H04N 5/23296* (2013.01); *G08B 13/19645* (2013.01); *G08B 13/19608* (2013.01)

(58) Field of Classification Search
CPC .......... H04N 7/18; H04N 5/225; G06F 11/30; G06F 17/60
See application file for complete search history.

(56) References Cited

U.S. PATENT DOCUMENTS

| | | |
|---|---|---|
| 5,581,625 A | 12/1996 | Connell |
| 5,953,055 A | 9/1999 | Huang et al. |
| 6,195,121 B1 | 2/2001 | Huang et al. |
| 6,654,047 B2 | 11/2003 | Iizaka |
| 7,806,316 B1 | 10/2010 | Torres et al. |
| 8,037,969 B2 | 10/2011 | Curt et al. |
| 2004/0210474 A1* | 10/2004 | Hart ................. G06Q 10/06398 705/7.42 |

(Continued)

OTHER PUBLICATIONS

C. Arth, et al. "Object reacquisition and tracking in large-scale smart camera networks", Int. Conf. on Distributed Smart Cameras, Sep. 25-28, 2007, Vienna, Austria, 8 pgs.

(Continued)

*Primary Examiner* — Sath V Perungavoor
*Assistant Examiner* — Patricia I Young
(74) *Attorney, Agent, or Firm* — Fay Sharpe LLP

(57) ABSTRACT

A system and method for object tracking and timing across multiple camera views includes local and global tracking modules for tracking the location of objects as they traverse particular regions of interest within an area of interest. A local timing module measures the time spent with each object within the area captured by a camera. A global timing module measures the time taken by the tracked object to traverse the entire area of interest or the length of the stay of the object within the area of interest.

16 Claims, 6 Drawing Sheets

(56) References Cited

U.S. PATENT DOCUMENTS

| | | | |
|---|---|---|---|
| 2005/0134685 A1* | 6/2005 | Egnal | H04N 7/181 348/157 |
| 2009/0268033 A1* | 10/2009 | Ukita | G06T 7/2093 348/169 |
| 2010/0082569 A1 | 4/2010 | Cresto et al. | |

OTHER PUBLICATIONS

B. Coifman et al., "A real-time computer vision system for vehicle tracking and traffic surveillance", Transportation Research Part C: Emerging Technologies, vol. 6, (4), 1998, 32 pgs.
O. Hamdoun et al., "Person re-identification in multi-camera system by signature based on interest point descriptors collected on short video sequences", Int. Conf. on Distributed Smart Cameras, Paris, Sep. 2008, 6 pgs.
Gandhi et al., "Person tracking and reidentification: Introducing panoramic appearance map (PAM) for feature representation", Machine Vision and Applications, 2007, vol. 18, pp. 207-220.
"The Drive-Thru Experience", Published on QSR Magazine, Copyright 2013 Journalistic Inc. http://www/qsrmagazine.com/reports/drive-thru-experience.
U.S. Appl. No. 13/441,194, filed Apr. 6, 2012, Bernal et al.
U.S. Appl. No. 13/461,191, filed May 1, 2012, Bernal et al.
U.S. Appl. No. 13/461,161, filed May 1, 2012, Bernal et al.

\* cited by examiner

SYSTEM AND METHOD FOR OBJECT TRACKING AND TIMING ACROSS MULTIPLE CAMERA VIEWS

This application claims the priority benefit of U.S. provisional application Ser. No. 61/694,596, filed Aug. 29, 2012, the disclosure of which is incorporated herein by reference in its entirety.

TECHNICAL FIELD

The subject embodiments relate to systems and methods for analysis of data objects perceived by a video sensor system, and particularly temporal measurements of sensed objects relative to regions of interest within the video sensor area of interest.

BACKGROUND

Data-driven retailers are showing increased interest in process-related data from which performance metrics can be extracted. One such performance metric is a customer's time waiting in queues (particularly when the customer must perform actions at various stations along the queue), from which guidelines to improve order efficiency and customer satisfaction can be extracted. Millions of such queue-waiting customers are served via drive-thru operations every day. Slight improvements in efficiency or customer experience can have a large financial impact on such businesses. These retailers are heavily data driven, and they therefore have a strong interest in numerous customer and store metrics such as queue lengths, experience time in-store and drive-thru, specific order timing, order accuracy, and customer response.

Camera networks that employ a plurality of cameras and associating views are used to monitor vehicle movement in drive-thru businesses. However, such networks have usually been primarily implemented for security purposes, not customer service data acquisition. An important part of any system purposed for such data acquisition will require practical implementations of systems and methods for object tracking and timing across multiple camera views.

In situations where the size of areas of interest being video surveilled is significantly larger than the field of view of an individual camera, the use of camera networks consisting of multiple cameras which are typically intercommunicated through a central controller is desired. While such situations arise often, video monitoring of retailer drive-thru traffic is of particular interest to data-driven ones of such retailers who are especially interested in extracting performance metrics from the process-related data. One such performance metric is a customer's time waiting in various queues at the retail store, from which guidelines to improve order efficiency and customer satisfaction can be extracted. It is estimated that drive-thru operations account for 50 to 65% of a typical fast-food business. Consequently, the monetary benefits that would arise from more efficient drive-thru operations are significant. There is a need for improved video-based methods for object tracking and timing across multiple camera views. These methods are of interest since they can be applied in situations where drive-thru operation monitoring and statistics gathering is desired.

Within the context of video-based object tracking, object re-identification deals with the tracking of an object across fields of view of multiple cameras in camera networks, or across multiple fields of view of a single camera, such as those of a Pan-Tilt-Zoom (PTZ) camera. While significant work exists on object, vehicle and person re-identification, there is a need for improvements on the estimation of the timing of objects as they traverse the multiple fields of view of a set of cameras in a camera network. Individual timing information of an object is of interest in a wide variety of applications beyond retail applications, including surveillance (where alerts can be triggered if a specific person loiters in a specific area beyond a previously specified time length), fleet vehicle monitoring (e.g. monitoring and timing of delivery trucks, and public transportation vehicles such as taxis, buses and subways) and automated race-related statistic estimation (e.g. to automatically estimate lap times of vehicles, bicyclists, runners, etc.). A related technology to note is "point-to-point" speed measurement on a highway. Indeed, in that application times are determined that are associated with multiple camera views, but the technical problem and solution differs significantly from the present. In the highway scenario, the vehicles are moving at near constant speed at the time of a view and only one time per view needs to be captured to accurately determine speed between views that are possibly miles apart. In the drive-thru setting, specific times that occur within a given camera's view time are important. Further, the vehicles will stop, start, and change speed during a viewing time. One simple time recording per view as performed on highways will not represent timings relevant to drive-thru events.

Regarding the use of video analytics techniques in retail scenarios, significant efforts have been devoted to developing automated analysis of human queues in retail spaces. With regards to vehicle traffic management in a drive-thru scenario, systems exist for automatically detecting the presence of a vehicle via the use of RFID tags, for verifying the accuracy of a drive-thru product delivery, and to match transaction and visual customer data; however, no methods are known to automatically compute drive-thru queue statistics. Such statistics are particularly important to gauge the success of drive-thru installations which can be measured in terms of return of investment. In particular, there is a direct correlation between speed of service and customer satisfaction. In stores where consumer's perception of speed of service increases, same-store sales tend to increase as well. When a retailer has the desire to capture vehicle flow statistics, external consulting companies that are often employed to manually perform these tasks. In certain occasions, the restaurant employees themselves are equipped with timers or directly have control of equipment that measures elapsed customer queue waiting times by starting and stopping timers at the push of a button when an order is placed and delivered, respectively. These methods, however, typically lead to over optimistic timing estimates as they can easily be manipulated by the employees. There is thus a need for a system and method for object tracking and timing across multiple camera views that can be applied in tasks of drive-thru queue timing measurement and statistic estimation which would overcome the limitations of currently used methods.

FIG. 1 shows a plane view of a local quick service restaurant ("fast food") building. Three locations of interest to the drive-thru process (order, pay and present points) are shown. The location where a drive-thru vehicle queue would form is also indicated. Clearly, unless aerial monitoring is an option (and even that solution will be susceptible to significant occlusion from the overhang roofs), a camera network setup is required to monitor drive-thru queue activity including points of interest.

BRIEF DESCRIPTION

The present embodiments relate to systems and methods for object tracking and timing across multiple cameras. One embodiment comprises the following modules: (1) A video acquisition module comprising two or more video cameras that record video of the area of interest (e.g., drive-thru, race track, highway, gas station, etc.), (2) an object detection module that detects the presence of objects as they enter the field of view of each camera, (3) a local object tracking module that tracks the location of objects as they traverse the field of view of each camera, (4) a global object tracking module that tracks the location of objects as they traverse the area of interest, possibly across fields of view of different cameras, (5) a local timing module that measures the time spent by each object within the area captured by each camera, and (6) a global timing module that measures the time taken by the tracked object to traverse the area of interest or the length of stay of the object within the area of interest. Note that since the area of interest can span the fields of view of multiple cameras, tracking and timing across video feeds from different video cameras must be supported. Benefits of the embodiments include automation of data acquisition that is typically gathered manually, as well as the potential to provide value-added services such as anomaly detection, surveillance and parking lot monitoring in retail drive-thru scenarios.

DETAILED DESCRIPTION

Figure 1:
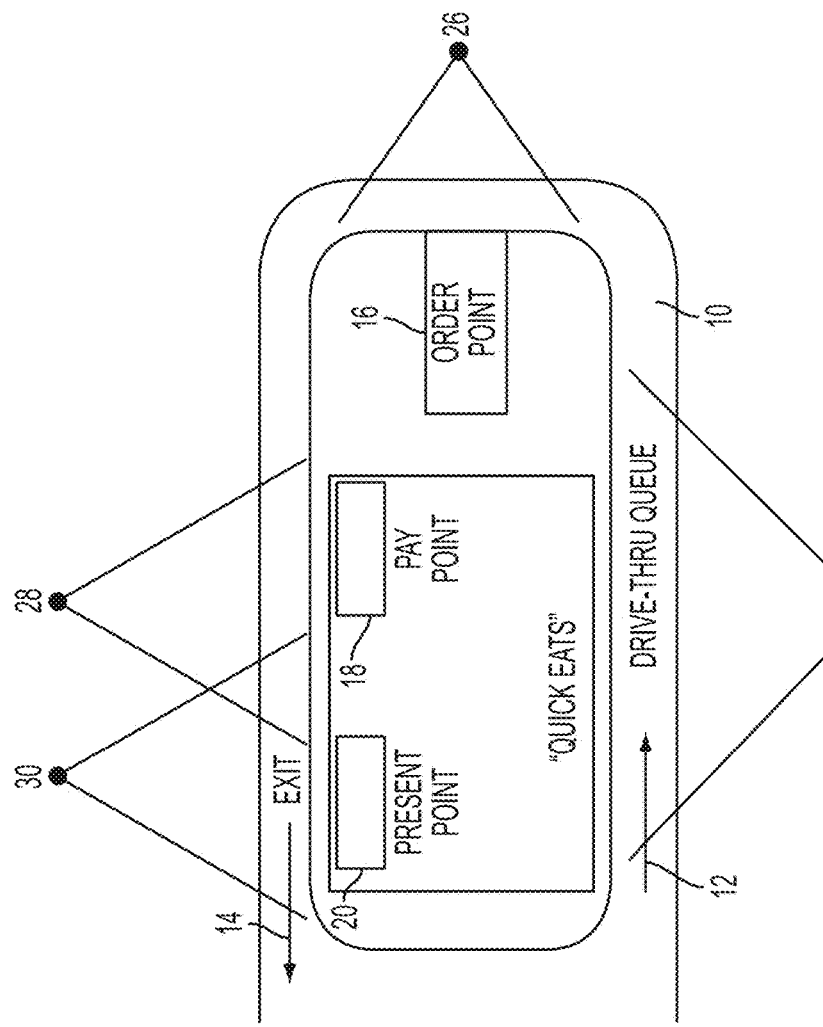
FIG. 1 is plan view of a drive-thru store operation including a plurality of cameras viewing the store's customer driveway.

With particular reference to FIG. 1, a fast food restaurant is shown including a drive-thru service. An area of interest 10 is shown comprising the entire driveway that a vehicle would traverse from the entrance 12 to the exit 14. The area of interest 10 includes particular regions of interest such as the order point 16, pay point 18 and present point 20. One embodiment of a plurality of cameras layout shows the first camera 24 sensing a portion of the entrance of the drive-thru queue, a second camera 26 viewing the order point 16, a third camera 28 viewing the pay point 18 and a fourth camera 30 assessing the present point area 20. Although a plurality of cameras are shown, it is also within the scope of the embodiments to include a single camera that is capable of multiple views in place thereof. For example, a single camera with a Pan-Tilt-Zoom (PTZ) imaging system could replace the two cameras measuring the pay point area and the present point area. In a scanning or PTZ imaging system, a vehicle may be viewed for some time, the view direction may need to be changed for some period, then the vehicle may be viewed again. The embodiments comprehend consistent timing in these and other multi-view scenarios. It should be noted that the pay point camera 28 and the present point camera 30 overlap in their viewing areas while the entrance queue camera 24 and the order point camera 26 have no overlap.

Figure 2:
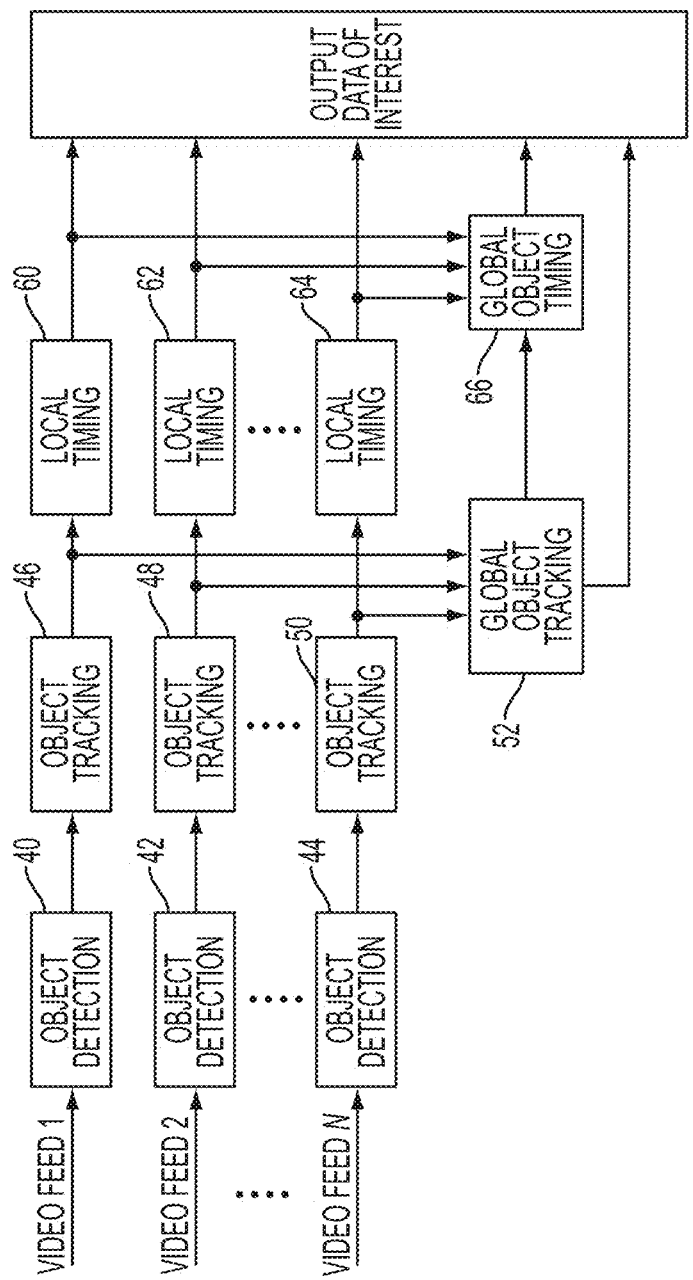
FIG. 2 is a block diagram of an embodiment including a plurality of processing modules in the flow of data therebetween.
Figure 3:
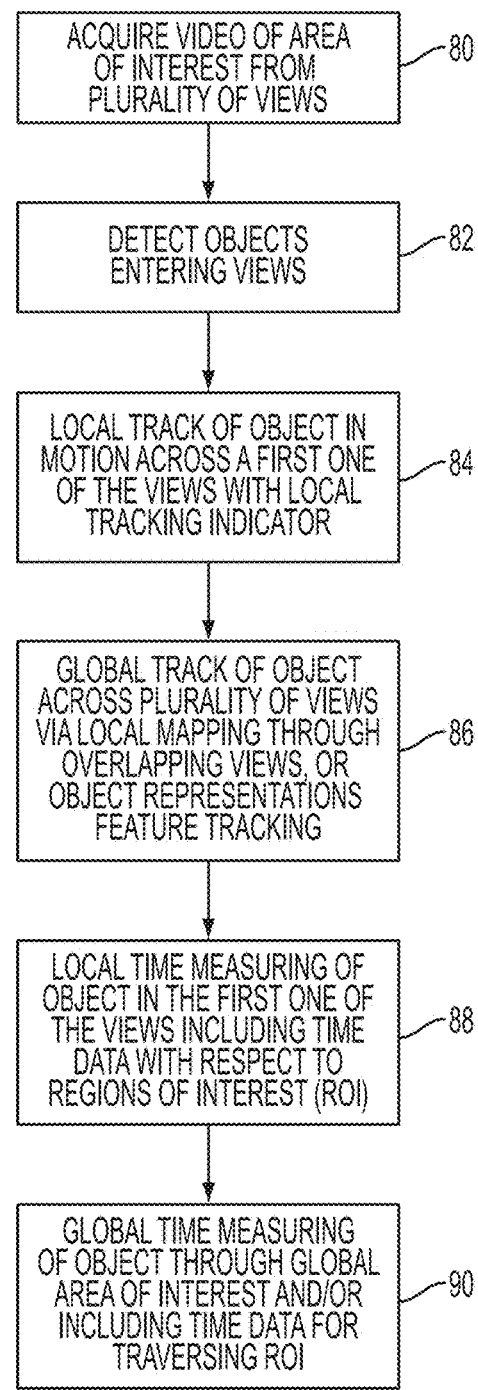
FIG. 3 is a flowchart of a process of implementing the subject embodiments.

With reference to FIGS. 2 and 3, the data stream from the cameras, video feed 1, video feed 2, ... video feed N, is initially acquired by a respective video acquisition module 32 (not shown) configured for each data stream.

Each video acquisition module 32 may comprise one or more of the multiplicity of cameras 24, 26, 28, 30 that acquire video from the area of interest 10. The arrows in FIG. 1 indicate the direction of the traffic flow and the dots 24, 26, 28, 30 indicate one possible layout of the cameras. The field of view of each camera is approximately illustrated with the rays emanating from the dots.

Figure 4A:
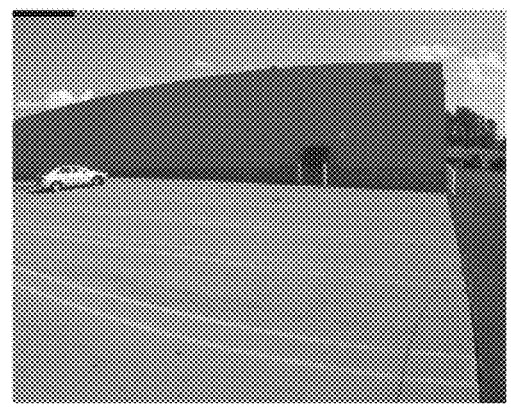
FIGS. 4a and 4b show a color frame containing a vehicle in motion along with the binary mask indicating where motion was detected.
Figure 4B:

After the video is acquired 80, the object detection modules 40, 42, 44 detect 82 the presence of objects as they enter the field of view of each camera. Object detection can be performed by temporal differencing of frames, and motion detection approaches such as those based on background estimation and subtraction and optical flow can be used. FIGS. 4a and 4b show a color frame containing a vehicle in motion along with the binary mask indicating where motion was detected (white pixels indicate pixels in motion).

Figure 5A:
FIGS. 5a and 5b illustrate the output of the local object tracking and local timing modules; and, FIGS. 6a and 6b show a set of output frames after being processed by the global tracking and timing modules.
Figure 5B:

The detected objects are next tracked through the local viewing area. The local object tracking modules 46, 48, 50 track 84 the location of an object in motion across the field of view of the camera. In an implementation of the algorithm, tracking can be achieved via algorithms such as mean-shift tracking. A mean shift tracker estimates the location of a given object in the current frame by learning a histogram-based color representation of the object in previous frames and finding the location of a window in the current frame with a color distribution with maximal similarity with the learned histogram. Other tracking algorithms such as point and global feature-based, silhouette/contour, and particle filter trackers can be used. A local object tracking module outputs spatio-temporal information describing at least the location, but possibly speed, acceleration, and other motion parameters, of the object across the range of frames in which it is present within the field of view of the camera. Specifically, for each object being tracked, the local tracking module outputs its location in pixel coordinates and the corresponding frame number across the range of frames for which the object remains within the field of view of the camera. FIGS. 5a and 5b illustrate the output of the local object tracking and local timing modules. The local object tracking module keeps track of the identity of the multiple objects being tracked and assigns an indicator such as uniquely color labeled tracking indicators, one to each object.

Due to the susceptibility of traditional tracking approaches to partial and total occlusions, additional constraints in the tracking results can be imposed in order to achieve robustness to such situations. For example, only candidate locations in the current frame that correspond to expected rates/directions of motion can be considered. Additionally, specific regions of interest (ROI) to which motion of objects of interest is confined, based on a priori known geometry of the area of interest, can be defined, so that objects in motion outside those ROI are not erroneously tracked.

The objects are next globally tracked 86. The global object tracking module 52 tracks the location of objects as they traverse the area of interest across fields of view of different cameras. Depending on the configuration of the camera network, object tracking across different cameras can be achieved in different ways. For example, in the case of the cameras used in the demonstration of the present embodiment, there is a slight overlap between the fields of view of the cameras 28, 30. In this scenario, camera calibration techniques, which map camera coordinates in pixel units to real-life, absolute coordinates can be used to map the output of the local tracking module in pixels to real-life coordinates. Specifically, if at a given instant in time, the output of local tracker 46 maps to real-world coordinates $(x_1,y_1,z_1)$ in meters, the output of local tracker 48 maps to real-world coordinates $(x_2,y_2,z_2)$ in meters, both coordinates relative to a common coordinate system origin, and the Euclidean distance between both coordinates is smaller than a given threshold T (in an example embodiment, T can be set to half the length of a standard vehicle), then the images of both objects are deemed to correspond to the same real-life object. In this manner, the simultaneous presence of an object in the region of overlap of the multiple fields of view can be detected and object tracking information can be shared and/or exchanged between the multiple cameras in a process known as camera hand-off. Additional information regarding the appearance of the object in addition to its spatial location alone can be used to improve the robustness of the camera hand-off process.

When the tracking is performed across cameras without overlapping fields of view 24, 26, cross-camera tracking is performed by extracting representative features of objects that are invariant to the multiple viewing conditions across the camera network. Examples of such features are license plates, vehicle color, make and model (if the scale of the area of interest is small enough where ambiguities are unlikely to arise from multiple vehicles with similar makes and models), and generic sets of features such as Harris Corners, Scale Invariant Feature Transform (SIFT), Local Binary Patterns (LBP) and Speeded-up Robust Features (SURF), etc. When point features are used as object identifiers, a full dataset of interest points per object is extracted and maintained so that object re-identification is still possible when some of the extracted features are occluded due to varying viewing conditions.

Further simplifications derived from additional constraints imposed by regularized environments such as drive-thrus, race tracks, and gas stations can be imposed in order to achieve improved robustness in cross-camera tracking. For example, the direction of traffic in such scenarios is typically restricted, and so camera hand-offs only occur in certain directions. Even in larger-scale problems such as city traffic surveillance, certain routes can be discarded with knowledge of authorized traffic flow, and/or vehicle transit limitations (e.g. heavy trucks not being allowed in residential areas).

The local timing modules 60, 62, 64 measure 88 the time spent by each object within the field of view of each camera. It uses the local tracking information data, which contains spatio-temporal information describing the location of the object. Specifically, the local tracker records the spatial location of the object for each frame number within a range of frames in which the object was present in the field of view of a given camera. Since the frame rate of the acquired video is known in terms of a fixed number of frames per unit time, the frame number field of the spatio-temporal data can be translated into standard time units such as seconds or minutes. Specifically, if an object has been tracked for the past f frames in a given video feed with frame rate R fps, then its absolute length of stay, in seconds, is $t=f/R$. FIGS. 5a and 5b show two sample frames processed by the local timing module. In addition to a colored rectangle indicating the location of the tracked vehicle, the timing algorithm displays the length of stay of each particular vehicle within the field of view of the camera, in seconds.

As mentioned earlier, timing data is particularly critical for the points of interest to the drive-thru operation, namely the order 16, pay 18, and present 20 points. In a video-based drive-thru monitoring application, each point of interest will be monitored by at least one camera. For example, in one scenario, the order point will be covered by camera 26, while the pay and present points will be monitored by cameras 28, 30. In an alternative embodiment, and exploiting the proximity of multiple interest points, two or more such points can be monitored by a single camera. The local timing module can be used to monitor the performance of each of the points of interest by measuring the time each vehicle spends at each of the points of interest. In this case, specific ROIs associated with each point can be defined, and a separate point of interest timer initialized every time a new vehicle stops in the designated ROI, and timers are triggered only when the presence of stationary vehicles in certain ROIs is detected.

The global timing module 66 measures 90 the time taken by the tracked object to traverse the area of interest 10, or the length of stay of the object within the whole area of interest 10. It uses the outputs from the local timing and global tracking modules. It relies on knowledge of synchronization data between the multiple video feeds to achieve timing data normalization across multiple cameras. Specifically, if a given object was first detected within the area of interest at time of day $T_1$ and within the field of view of a given camera, and the same object has been identified in the field of view of a different camera at a later time of day $T_2$, then the object has remained $T_2-T_1$ seconds in the area of interest. This information is shared among cameras so that, although the object has just appeared on the field of view of a given camera, the system has a way of knowing that the length of stay of the object is equal to the time elapsed since its first detection. Global timers can be reset on a periodic basis, for example, every day or every week. Another option is to count the re-appearance of a car as its first appearance if it happens after an extended period of time; specifically, when $T_2-T_1$ is larger than a predetermined threshold, the length of stay of the object can be set to 0. Equivalently, only searches for matching cars that have been detected within a predetermined time length are executed by the global tracking module.

Alternatively, sub-global (but still hyper-local) timing information across portions of the area of interest can be obtained by sharing information across subsets of cameras in the camera network. This technique is particularly useful for cameras with overlapping fields of view where the camera hand-off is performed by detecting the simultaneous presence of an object on both videos. At the same time the hand-off is performed, the local timing information can be shared among the two cameras involved, from the camera capturing the object leaving the scene to the camera capturing the object entering the scene.

Figure 6A:
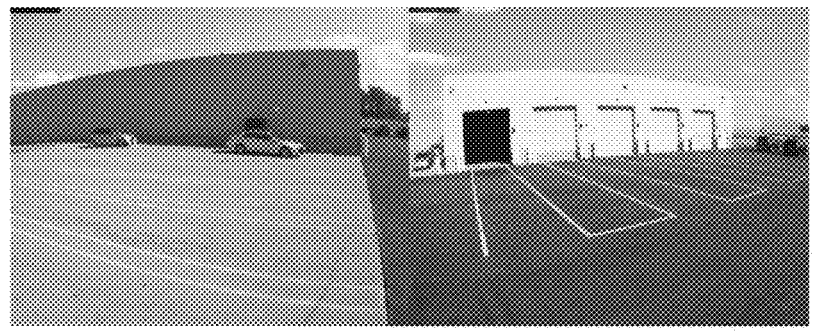
Figure 6B:
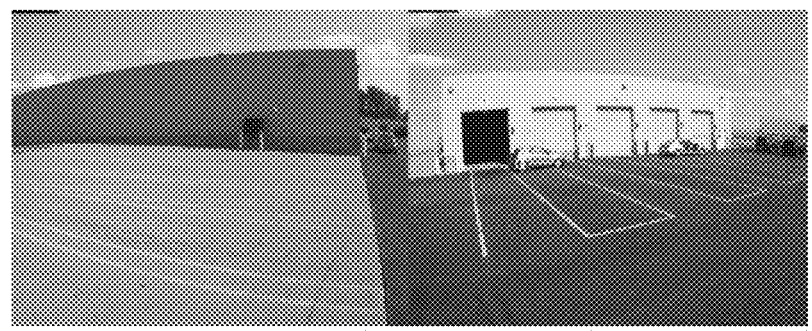

FIGS. 6a and 6b show a set of output frames after being processed by the global timing module. In this case, video frames from both cameras acquired simultaneously are placed side by side. The frames in FIG. 6a show the tracking and timing output before camera hand-off has occurred. The frames in FIG. 6b show tracking and timing outputs after camera hand-off has occurred. Consistent color coding or other marking of tracking boxes across both cameras may indicate that the object hand-off was successful. Also, the timing information being displayed corresponds to the global timing information, and indicates the total length of stay of each vehicle in the full area of interest.

It will be appreciated that variants of the above-disclosed and other features and functions, or alternatives thereof, may be combined into many other different systems or applications. Various presently unforeseen or unanticipated alternatives, modifications, variations or improvements therein may be subsequently made by those skilled in the art which are also intended to be encompassed by the following claims.

What is claimed is:

1. A spatio-temporal object tracking system for identifying an object traversing a plurality of video sensor views, including:
   a video acquisition system for sensing a plurality of local views of a global area of interest;
   an object detection module for detecting an object entering one of the local views;
   a local object tracking module for tracking a motion of the object through the one local view comprising:
      assigning an indicator of an at least one invariant representative feature of the object through the global area of interest wherein the at least one invariant representative feature is selected from the group consisting of: license plates, vehicle color, vehicle make, vehicle model, Harris Corners, Scale Invariant Feature Transform (SIFT), Local Binary Patterns (LBP), and Speeded-up Robust Features (SURF);
      extracting and maintaining each invariant representative feature in a full dataset of interest points per object;
   a global object tracking module for tracking the object through the plurality of local views and the global area of interest;
   a local timing module for measuring time data of the object in the one local view; and,
   a global timing module for measuring time data of the object through the plurality of local views and a length of stay of the object through the global area of interest by synchronization of data across the plurality of video sensor views to achieve timing data normalization across the plurality of video sensor views.

2. The system of claim 1, wherein the video acquisition system comprises a plurality of video cameras arrayed in a layout relative to the global area of interest.

3. The system of claim 1, wherein the video acquisition system comprises a video camera with a Pan-Tilt-Zoom (PTZ) imaging system for acquiring the plurality of local views.

4. The system of claim 1, wherein the local tracking module includes a processor for associating a local tracking indicator with the object in the one local view.

5. The system of claim 1, wherein the global tracking module includes a processor for at least one of (1) re-identifying the object identified through local object tracking in overlapping multiple local views, and (2) object representative feature tracking of the at least one invariant representative feature through the plurality of local views.

6. The system of claim 1, wherein the local timing module includes a processor for detecting time data of the object relative to a local region of interest in the one local view.

7. The system of claim 1, wherein the global timing module includes a processor for detecting time data of the object relative to the global area of interest including local regions of interest therein.

8. The system of claim 7, wherein the detecting time data by the processor includes receiving an output from the local timing and global tracking modules and normalizing time data across the plurality of local views based on a synchronization of the video acquisition system.

9. A method of identifying an object traversing a plurality of video sensor views, comprising:
   acquiring video from a global area of interest from a plurality of local views;
   detecting when a moving object enters the plurality of local views;
   locally tracking the moving object across a first local view of the plurality of local views with a local tracking indicator comprising assigning an indicator of an at least one invariant representative feature of the object through the global area of interest wherein the at least one invariant representative feature is selected from the group consisting of: license plates, vehicle color, vehicle make, vehicle model, Scale Invariant Feature Transform (SIFT), Local Binary Patterns (LBP), and Speeded-up Robust Features (SURF);
   extracting and maintaining each invariant representative feature in a full dataset of interest points per object; and
   globally tracking the moving object across a plurality of local views by re-identifying the object identified through the local tracking through the plurality of local views including measuring time data of the object through the plurality of local views and a length of stay of the object through the global area of interest by synchronization of time data across the plurality of video sensor views to achieve timing data normalization across the plurality of video sensor views.

10. The method of claim 9, wherein the globally tracking further includes tracking the at least one invariant representative feature through the plurality of local views.

11. The method of claim 10, wherein the object invariant representative feature is invariant to the multiple viewing conditions across the video acquisition system.

12. The method of claim 9, further including performing local time measurement of the moving object in the first local view of the plurality of local views, wherein the local time measurement includes obtaining time data with respect to a region of interest.

13. The method of claim 9, wherein the global time measurement includes receiving local timing data and global tracking data to enable normalization of time data across the plurality of local views.

14. The method of claim 9, further including obtaining sub-global time measurement data across portions of the area of interest by sharing data obtained from the video acquired across the plurality of local views.

15. The method of claim 12, wherein the local time measurement is used to monitor the performance of a plurality of points of interest by measuring the time the moving object spends at each of the plurality of points of interest.

16. The method of claim 9, wherein the locally tracking the moving object is performed according to at least one of a mean-shift tracking algorithm, a point feature-based tracking algorithm, a global feature-based tracking algorithm, a template matching algorithm, a silhouette/contour tracking algorithm, a Kalman Filter based tracking algorithm and a particle filter tracker.

* * * * *